United States Patent [19]

Havens

[11] Patent Number: 5,298,310
[45] Date of Patent: Mar. 29, 1994

[54] STRIPED FILM AND APPARATUS AND METHOD
[75] Inventor: Marvin R. Havens, Greer, S.C.
[73] Assignee: W.R. Grace & Co.-Conn., Duncan, S.C.
[21] Appl. No.: 825,471
[22] Filed: Jan. 24, 1992

Related U.S. Application Data

[62] Division of Ser. No. 579,009, Sep. 7, 1990, Pat. No. 5,110,530.
[51] Int. Cl.$^5$ ................................................ B32B 9/00
[52] U.S. Cl. .............................. 428/204; 428/34.09; 428/35.02; 428/195; 428/206; 428/207; 428/221; 428/232; 428/913; 428/915; 428/916; 428/34.3; 428/35.2
[58] Field of Search ................ 428/34.09, 35.2, 204, 428/206, 913, 195, 207, 105, 221, 232, 915, 916

[56] References Cited

U.S. PATENT DOCUMENTS

| 2,808,617 | 9/1952 | Terracini et al. | 425/462 |
| 3,565,737 | 11/1965 | Lefevre et al. | 264/171 |
| 4,327,136 | 4/1982 | Thompson et al. | 428/35 |
| 4,552,789 | 11/1985 | Winchell | 428/132 |
| 4,737,391 | 4/1988 | Lustig et al. | 428/34.09 |
| 4,837,956 | 6/1989 | Dolence | 40/299 |
| 4,923,551 | 5/1990 | Wagers et al. | 156/244.11 |

Primary Examiner—Patrick J. Ryan
Assistant Examiner—Abraham Bahta
Attorney, Agent, or Firm—Mark B. Quatt

[57] ABSTRACT

Striped films of the invention can have two or more preferably polymeric layers, of which at least one continuous or discontinuous layer includes a pigmented resin. The striped film is produced by modifying conventional coextrusion dies to restrict the flow of a pigmented melt stream. The result is a striped film useful for identifying the contents of a package made from the film, tamper evidence, counterfeit protection and verification of properties. The stripes can be of one or more colors, and vary in width and spacing. The pigment can be a material visible in ordinary light, or a material invisible in ordinary light but visible in e.g. ultraviolet light.

6 Claims, 2 Drawing Sheets

STRIPED FILM AND APPARATUS AND METHOD

This application is a divisional of application Ser. No. 07/579,009, filed on Sep. 7, 1990 now U.S. Pat. No. 5,110,530.

BACKGROUND OF THE INVENTION

The present invention relates to packaging material, and in particular plastic film. The invention especially pertains to a striped film which easily identifies and distinguishes the contents of a package made from the film. This identification is accomplished without the need for printing the film.

Presently, many films are printed in either monocolor or multicolor by various techniques. Printing can help to identify the nature and source of the goods packaged in the printable material, and can contribute to the aesthetics and marketing appeal of the product.

Printing is often desirable, but adds to the cost of the packaging material. Many thermoplastic packaging materials are difficult or impossible to print without pretreatment of the material surface. Accurate printing requires expensive equipment and skilled labor, and adds a processing step before the finished film or laminate is available for distribution. Printing inks can be expensive. It is desirable to provide some of the benefits of printing without incurring some of these additional costs.

The inventor has found that stripes or "lanes" of pigment, dye, etc. can be coextruded in multilayer film structures. This is accomplished using a modification of existing die technologies. The result is easily identified, highly visible packaging for tamper evidence, counterfeiting protection, or marketing appeal. These features are achieved without the need for separate printing of the packaging material.

The film is especially useful in identifying genuine goods. A specific color or colors, and a specific pattern of stripes, can be preselected and used to package a given product. Counterfeits and unauthorized copies of these products can be quickly recognized by the absence of the "signature", distinctive striped packaging material.

SUMMARY OF THE INVENTION

In one aspect of the invention, a method of making a film comprises coextruding at least two melt streams, one of the melt streams including a pigment, in a multiple layer die wherein the flow of the melt stream containing the pigment is restricted so that the resulting film has a striped appearance.

In another aspect of the invention, a film comprises at least two layers, one of the layers including a pigment distributed within the layer so that the resulting film has a striped appearance.

In still another aspect of the invention, an apparatus for making a film comprises a multilayer die which has a means for restricting the flow of a pigmented melt stream so that the resulting film has a striped appearance.

BRIEF DESCRIPTION OF THE DRAWING

The invention can be further understood by reference to the drawings.

Referring to the drawing figures.

DESCRIPTION OF THE PREFERRED EMBODIMENTS

Figure 1:
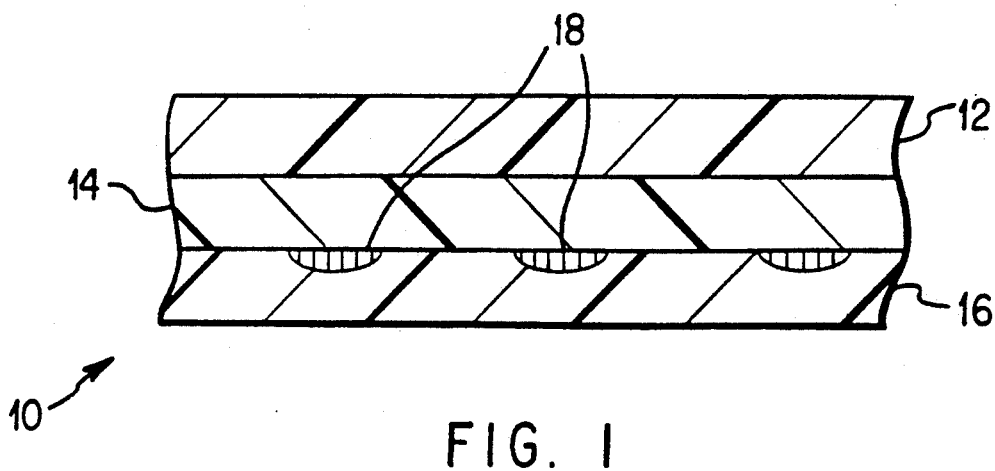
FIG. 1 is a cross-sectional view of a striped film of the invention.

Referring to FIG. 1, a coextruded or extrusion coated film 10 has outer layers 12 and 16. These layers can function as e.g. sealant or abuse-resistant layers, and can also be bonded to additional layers if desired.

Throughout this specification, the layers described as part of the inventive film are preferably polymeric in composition, and more preferably comprise any of the conventionally known and available polymeric resins used in film extrusion applications. These include by way of illustration, polyolefins (especially ethylene polymers and copolymers); polyamides; polystyrenes; polyesters; polycarbonates; polyvinyl alcohols; polyvinyl chlorides; etc.

Interior layer 14 is bonded to outer layer 12 and portions of outer layer 16.

Stripes 18 occur at intervals within the film, bonded to interior layer 14 and outer layer 16. These stripes are depicted in FIG. 1 as having a red tint, but can be any color.

Figure 2:
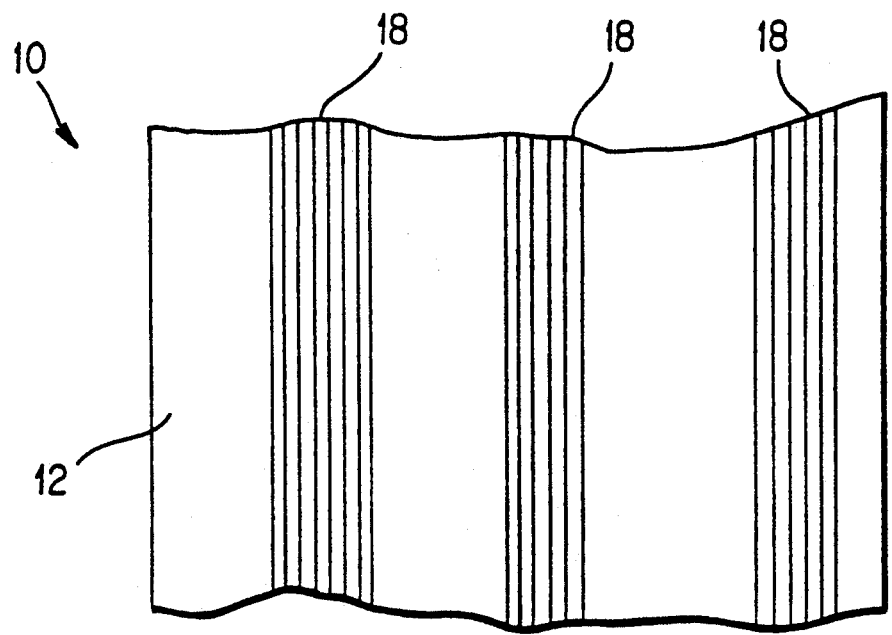
FIG. 2 is a plan view of the striped film of FIG. 1.

FIG. 2 shows a plan view of the striped film of FIG. 1.

Figure 3:
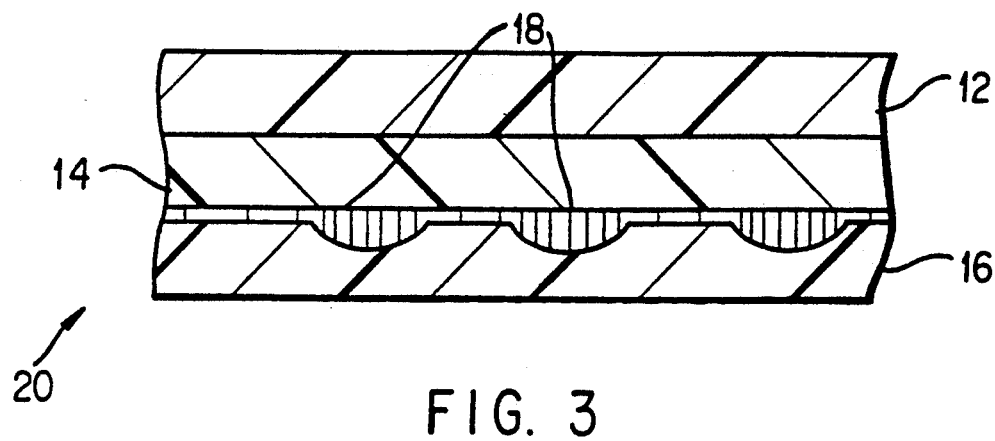
FIG. 3 is a cross-sectional view of an alternative embodiment of the inventive striped film.

In FIG. 3, a striped film is shown like that of FIG. 1, but in which the pigmented resin forming stripes 18 extends as a relatively thin layer throughout the film. This "bleed" of the pigmented resin is caused by small amounts of the pigmented resin passing through restrictions in die components, as described more fully below. This "bleed" results in a film which is lightly tinted throughout, with more intensely colored stripes at intervals throughout the film.

Figure 4:
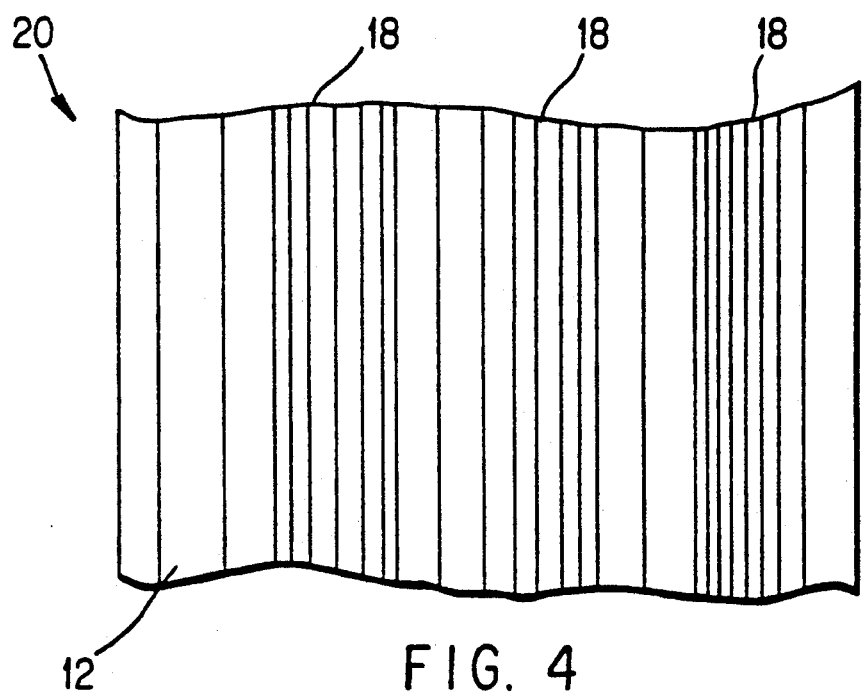
FIG. 4 is a plan view of the striped film of FIG. 3.

FIG. 4 demonstrates this distribution in color by using widely spaced vertical lines for the lightly tinted "bleed" areas, and more narrowly spaced vertical lines for the more intensely colored stripes occurring at intervals throughout the film.

The pigmented material can therefore form a discontinuous layer, as shown in FIG. 1, or a continuous layer with uneven layer thickness across the film, as shown in FIG. 3.

It will be evident to those skilled in the art that if the bleed phenomenon is significant, the film can become substantially colored throughout and lose most or all of its striped or banded effect.

To understand how the striped films of the present invention are produced, a review of coextrusion die technology is helpful.

Multiply coextruded films are typically commercially made via extrusion of the different individual resin plies through a die that consists of nested multiple concentric cylinders forming a central annulus. The number and arrangement of these nested cylinders and the resins fed to them determines the final structure of the film produced. Each of these cylinders may have spiral grooves machined into the outside to evenly distribute the pressure and flow of the molten resin. The other face of the resin channel is the inside of the next cylinder. The channel between these two cylinders may gradually taper and slope toward the central annulus. At the channel exit, the final relative gauge and distribution of the exiting resin layer is determined by relative concentricity and spacing of the two cylinders to each other and to the central annulus as well as other flow related variables such as pressure and resin viscosity including the other layers. Such dies are commercially available from several manufacturers such as Sano, Battenfield, Reifenhauser and Barmag.

The films exiting these dies may be further processed to make them thinner or to achieve orientation such as the trapped or double bubble process.

An alternative multiply coextrusion technology is to combine the different resins in appropriate layers within a feedblock ahead of a sheet die by means of vanes and guides within the feedblock. The multiply coextrusion film exiting the die may be made thinner with further processing. One method is to stretch the film in the longitudinal direction by winding it more rapidly in that direction. Another method is by a process known as "tenterframing." This is a process which stretches the original film longitudinally, transversely or in some combination of the two to produce a thinner film and, if desired, some orientation. Feedblocks and feedblock technology are commercially available from Cloeren and Welex.

Other multiply die technologies are well known to the industry by names such as multimanifold dies in which melt streams are joined and spread within the body of the die rather than externally in a feedblock. Similarly, other methods are well known for the production of thin films including orientation to achieve shrink and other properties. All of these dies and processes are well known to those skilled in the area of coextrusion and have been widely described in the literature.

The current invention utilizes a modification of these die technologies to incorporate lanes or stripes of pigmented or dyed materials for purpose of identification of the film or product. In the case of the multiple concentric cylinder dies, one or more of the exit annular openings is eliminated by making the two cylinders come together in a slight interference fit, in essence, sealing the channel exit. Pigmented or dyed resin is allowed to exit the channel only through very narrow grooves machined radially across the interference fit zone. In this way the exiting pigmented resin forms lanes of pigment, or stripes, between adjacent layers of resin or on the inner or outer surface of the coextruded film. By varying the relative width of the machined exit grooves and their relative spacing, different patterns of stripes may be achieved.

Similarly, in the feedblock technology, two resin directing guides are machined to form a tight fit. Across this tight fitting lip, small grooves are machined for the exit of the pigmented resin which will form stripes.

The use of a constricted exit into which thin grooves are cut for the pigmented resin to exit may be similarly applied to other die systems to achieve the same effect of stripes. The above are two examples of how this may be achieved but the invention is not necessarily limited to these for the physical production of stripes or lanes in the finished film. The invention is also not limited to only one grooved exit but may be used with other grooved exits to introduce additional colors and effects.

The width, number, and distribution of the stripes can also be varied from film to film by altering the arrangement, number, and configuration of the thin grooves or other means for controlling the flow of pigmented or dyed resin in any particular die configuration.

The intensity of the striped or banded effect can also be affected by the choice of pigments, concentration of the pigment within the base or carrying resin, and thickness of the pigmented layer.

EXAMPLE 1

A polymeric, multilayer striped film was produced. This film had two outer layers each comprising a low density polyethylene with a antiblock present as 1% by weight of each layer (NA 345-166 from Quantum/USI). One of the interior layers was a low density polyethylene, NA 345-013, also from Quantum/USI.

The other interior layer was an ethylene vinyl acetate copolymer-based polymeric adhesive, Plexar 107 from Quantum, which had been preblended with about 5% by weight of the layer with a pigmented resin.

The resin itself was a blend of about 75% by weight ethylene vinyl acetate copolymer (UE 635 from USI) and about 25% red pigment (Fanchon red) R-6227 from Mobay.

A coextrusion die system was modified to provide narrow spaced grooves at selected locations such that the flow of the pigmented melt stream was restricted. This resulted in a final film with distinct red stripes of substantially uniform width, spaced apart from each other at regular intervals. The film in the areas between the stripes had a faint pink tint.

EXAMPLE 2

A film like that of Example 1 is produced, but including a second layer of a white pigmented resin distinct from the first pigmented layer described for Example 1. The second layer has a normal, i.e. unrestricted melt flow. This results in a film like that of Example 1, but in which the area between the stripes has a white color. The film therefore consists of alternating red and white bands.

The invention has been described with reference to preferred embodiments and specific examples, but one skilled in the art will appreciate that modifications can be made within the spirit and scope of the claims which follow. For example, any number of polymeric resins can be brought together to produce the striped film of the present invention. The choice of polymeric resins is to a great extent limited only by considerations of cost, desired end use, and the like. The thicknesses of the various film layers used in the present invention can differ within a wide range, as long as the pigment carrying layer or layers are of sufficient thinness that the desired striped or banded pattern is obtained. Total film gauges can be as low as 0.1 mil or as high as 20 mil. Cast and blown film processes can be used. Films used in the present invention can optionally be cross-linked by e.g. irradiation or chemical cross-linking. Irradiation can be done by the use of high energy electrons, ultra violet radiation, X-rays, gamma rays, beta particles, etc. Many apparatus for irradiating films are known to those of skill in the art. Irradiation is typically carried out at a dosage between about 1 MR and 20 MR.

Post extrusion steps such as extrusion coating, lamination, orientation, calendaring, thermoforming and the like can be carried out if desired.

Orientation is typically carried out by blown bubble or tenterframe techniques well known in the art. This process step renders films heat shrinkable. Further steps such as annealing or heat setting can also be carried out if desired. It is emphasized that stripes of different widths can be made. Very wide pigmented areas combined with relatively narrow clear areas can result in a film which is essentially a colored film with clear lanes.

These clear lanes or "windows" permit visual identification of the contents, e.g. to validate freshness in a food product. The pigmented area can be used as is, or as a background for printing, thus saving one printing step.

The stripes do not necessarily have to be pigmented. For example, a material which is visible only in ultraviolet light (e.g. UV fluorescent dyes) can be used in place of a pigment visible in ordinary light. This would result in a film with an unstriped appearance in ordinary light, but having a striped appearance when placed in UV light. This permits product identification/verification without obscuring the contents in the normal distribution chain.

The terms "stripe" and "lane" are therefore used herein to mean any stripe, line, or other band which is detectable in either ordinary light, or other light such as UV light.

The term "pigment" is used herein to mean pigments, dyes, tints, and colors visible in ordinary light. The term is also used to mean materials that can be identified and distinguished from portions of the film not containing such materials, when the material is put under an ultraviolet or other light source.

What is claimed is:

1. A film comprising at least three layers, of which at least one interior layer comprises a pigmented resin distributed so that the resulting film has a striped appearance; each of the layers comprising a polymeric resin.

2. The film according to claim 1 wherein the pigment is detectable in ordinary light.

3. The film according to claim 1 wherein the pigment is detectable in ultraviolet light.

4. The film according to claim 1 comprising at least four layers.

5. The film according to claim 1 wherein the film is oriented.

6. The film according to claim 1 wherein the film is heat shrinkable.

* * * * *